United States Patent [19]

Parks et al.

[11] Patent Number: 4,553,949
[45] Date of Patent: Nov. 19, 1985

[54] UNIVERSAL JOINT WITH CLEARANCE ELIMINATION ELEMENTS

[75] Inventors: Kevin B. Parks; David D. Jordan; Alistair G. Taig, all of South Bend, Ind.

[73] Assignee: Allied Corporation, Morristown, N.J.

[21] Appl. No.: 519,334

[22] Filed: Aug. 1, 1983

[51] Int. Cl.⁴ .............................................. F16D 3/20
[52] U.S. Cl. .................................. 464/153; 464/110; 464/118
[58] Field of Search ............... 464/110, 114, 118, 122, 464/123, 124, 147, 153

[56] References Cited

U.S. PATENT DOCUMENTS

| | | | |
|---|---|---|---|
| 1,732,354 | 10/1929 | Cooper | 464/153 |
| 2,346,058 | 4/1944 | Waldron | 464/147 X |
| 2,386,754 | 10/1945 | Snyder | 464/124 X |
| 2,681,552 | 6/1954 | Olson | 464/153 |
| 2,896,430 | 7/1959 | Olson | 464/153 X |
| 3,029,617 | 4/1962 | Marquis et al. | 464/123 |
| 3,120,744 | 2/1964 | Dunn | 464/122 |
| 4,274,268 | 6/1981 | Taig | 464/110 |
| 4,395,246 | 7/1983 | Taig et al. | 464/153 |

*Primary Examiner*—Stuart S. Levy
*Assistant Examiner*—Daniel P. Stodola
*Attorney, Agent, or Firm*—Ronald D. Welch; Ken C. Decker

[57] ABSTRACT

A universal joint comprises a housing receiving an input assembly and an output assembly. The assemblies include bearing shoes rotatable within the housing and a pair of wedge-like elements are engageable with the housing and the bearing shoes to accommodate wear and manufacturing tolerances for the universal joint.

3 Claims, 4 Drawing Figures

U.S. Patent  Nov. 19, 1985  4,553,949
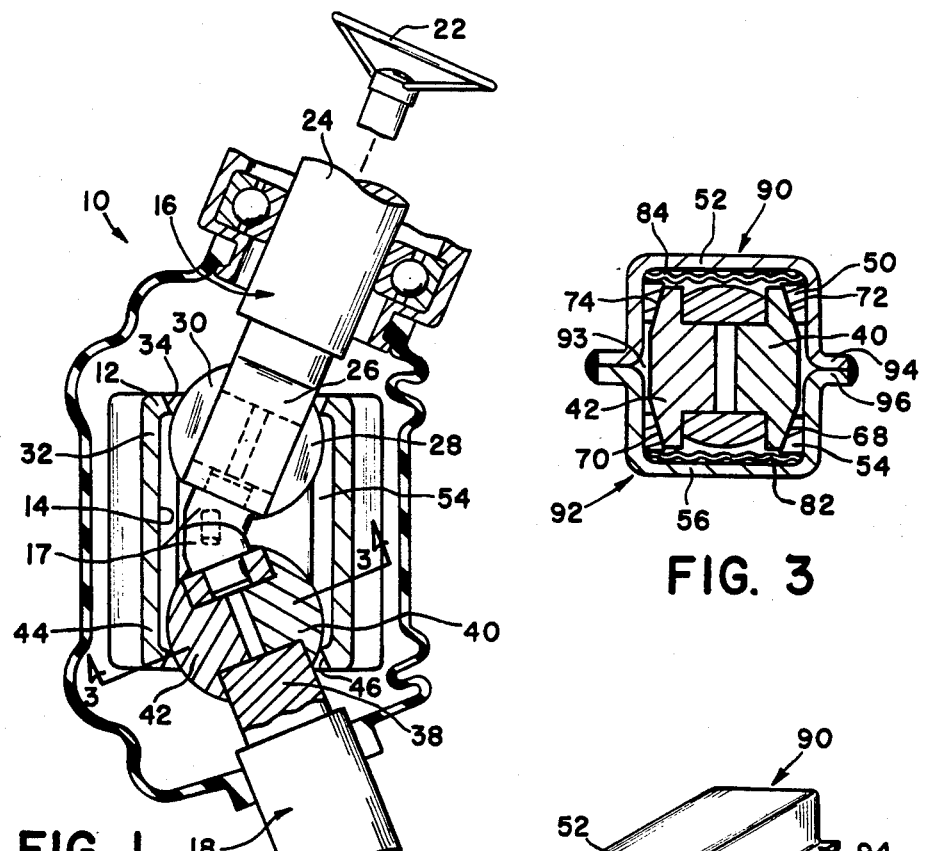
FIG. 1
FIG. 4
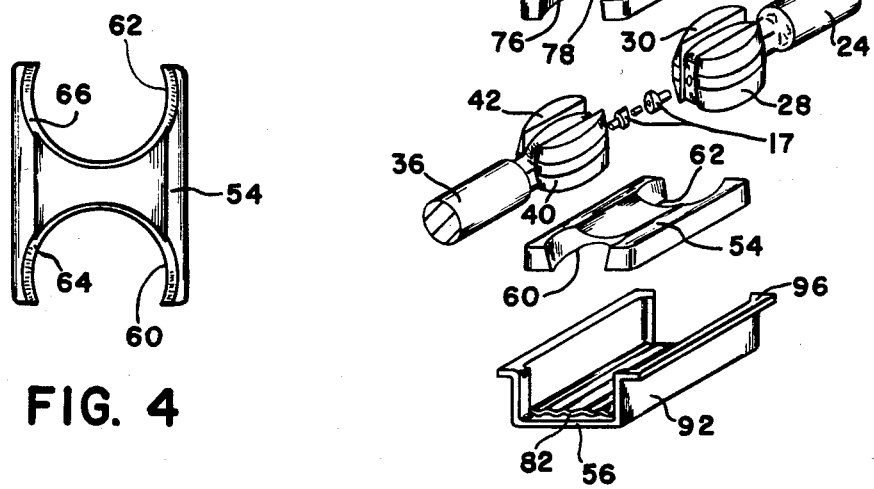
FIG. 3
FIG. 2

UNIVERSAL JOINT WITH CLEARANCE ELIMINATION ELEMENTS

BACKGROUND OF THE INVENTION

1. Field of the Invention

This invention relates to a universal joint wherein an input assembly imparts rotation to a housing which, in turn, imparts rotation to an output assembly.

In United States application Ser. No. 184,491, filed Sept. 5, 1980, a universal joint comprises an input assembly and an output assembly cooperating with a housing such that the input assembly and output assembly define an angular setting relative to the housing. The housing comprises a two-part assembly which is coupled together to retain the assemblies within the housing. If either of the assemblies are worn during the life of the universal joint, it is possible for lash or play to develop in the universal joint. With lash present in the universal joint the rotation of the output assembly relative to the input assembly can vary and the lash can result in noise being generated during rotation of the input assembly. Therefore, it is desireable to eliminate or reduce the possibility for lash or play without requiring a complete redesign of the universal joint disclosed.

SUMMARY OF THE INVENTION

The present invention provides a universal joint comprising a housing having a pair of openings leading to a cavity for receiving an input assembly with an input shaft and an output assembly with an output shaft, the input assembly being rotatable to rotate the housing which, in turn, rotates the output assembly, the input assembly and the output assembly defining variable angular settings relative to the housing as the input assembly, output assembly and housing rotate, the input and output assemblies including a pair of bearing shoes rotatable about separate parallel axes, and means cooperating with the bearing shoes, the input and output shafts and the housing to reduce play therebetween, characterized by said means comprising at least one wedge-like element disposed in engagement with said housing and said pair of bearing shoes whereby said pair of bearing shoes are biased into engagement with said input and output shafts, respectively, and said wedge-like element is biased into engagement with said housing.

It is an advantage of the present invention that a pair of wedge-like elements are easily disposed within a housing receiving the input and output assemblies while at the same time providing a lubricant carrying clearance between the assemblies and the housing.

BRIEF DESCRIPTION OF THE DRAWINGS

The invention will now be described with reference to the accompanying drawings illustrating but one embodiment of the invention.

FIG. 1 is a side view partially sectioned of a universal joint constructed in accordance with the invention.

FIG. 2 is an exploded view of the universal joint shown in FIG. 1.

FIG. 3 is a cross-sectional view taken along line 3—3 of FIG. 1.

FIG. 4 is a perspective view of one of the wedge-like elements shown in FIGS. 1-3.

DESCRIPTION OF THE PREFERRED EMBODIMENT

A universal joint 10 comprises a housing 12 with a cavity 14 therein receiving an input assembly 16 and an output assembly 18. A centering device 17 extends between the input assembly 16 and the output assembly 18 and is more fully discussed in United States application Ser. No. 184,491, filed Sept. 5, 1980. The input assembly is rotated by a steering wheel 22 to impart rotation to the housing 12 which, in turn, imparts rotation to the output assembly 18.

The input assembly 16 includes a shaft 24 terminating in an eyelet 26 within the cavity 14. The eyelet forms an opening to receive portions of a pair of bearing shoes 28 and 30. The outer surfaces of the bearing shoes 28 and 30 are arcuate to substantially define a circle, see FIG. 1, when attached to the shaft eyelet 26 to provide for rotation of the input assembly 16 in the housing 12. The housing 12 defines a first portion 32 adjacent opening 34 so that the portion 32 receives the pair of bearing shoes 28 and 30. The portion 32 remains in spaced relation to the pair of bearing shoes 28 and 30 in a manner hereinafter described. In a similar manner, the output assembly 18 includes a shaft 36 terminating in an eyelet 38 within cavity 14. The eyelet forms an opening to receive portions of a pair of bearing shoes 40 and 42. The outer surfaces of the pair of bearing shoes 40 and 42 are arcuate to substantially define a circle, see FIG. 1, when attached to the shaft eyelet 38. The housing 12 defines a second portion 44 adjacent the opening 46 so that the portion 44 receives the pair of bearing shoes 40 and 42.

In accordance with the invention, there is a first wedge-like element 50 disposed in housing cavity 14 adjacent a top end 52, see FIG. 3, and a second wedge-like element 54 disposed in housing cavity 14 adjacent a bottom end 56. Each wedge-like element 50 and 54 is identical to the other so that the following explanation of wedge-like element 54 is equally applicable to wedge-like element 50. In FIG. 4 it is seen that the wedge-like element 54 is substantially H-shaped with a pair of openings 60 and 62. The surface 64 forming the edge of opening 60 is frusto-conical and the surface 66 forming the edge of opening 62 is also frusto-conical. Each pair of bearing shoes 40, 42 and 28, 30 is provided with matching frusto-conical surfaces. That is, the bearing shoe 40 includes a frusto-conical surface 68 adjacent bottom end 56. The bearing shoe 42 includes a frusto-conical surface 70 adjacent bottom end 56. The bearing shoes 40 and 42 also include frusto-conical surfaces 72 and 74 adjacent the top end 52 and engageable with a corresponding frusto-conical edge 76 forming opening 78 on wedge-like element 50, see FIG. 2. The bearing shoes 28 and 30 are provided with substantially identical frusto-conical surfaces cooperating with frusto-conical edges for opening 62 of element 54 and opening 80 of element 50.

In order to bias the wedge-like elements 50 and 54 toward the center of the housing 12, a resilient member 82 is disposed between the bottom end 56 and the wedge-like element 54 and a similar resilient member 84 is disposed between the top end 52 and the wedge-like element 50.

The housing 12 comprises a first part 90 forming the top end 52 and a second part 92 forming the bottom end 56. A flange 94 for part 90 opposes a flange 96 for part 92 so that the flanges can be welded together or secured via other suitable means such as a nut and bolt. When the parts are secured together, the wedge-like elements 50 and 54 engage the pair of bearing shoes 28, 30 and 40, 42 to retain the latter in spaced relation to the wall of cavity 14 so that lubricant can be carried in this spacing 93. Moreover, if any of the parts of the universal joint 10 wear as a result of prolonged use, the resilient elements 82 and 84 will move the wedge-like elements 50 and 54 slightly closer toward the center of the housing to take up any clearance generated in response to the worn part. This take-up for clearance occurs for wear to the eyelets, the bearing shoes, the wedge-like elements and the housing parts. Consequently, the wedge-like elements will accommodate wear and also manufacturing tolerances for substantially all of the parts of the universal joint.

When the input assembly is rotated in response to an input torque applied to the steering wheel, the torque is first transmitted to the wedge-like elements 50 and 54 and then to the housing. Although the wedge-like elements engage the output assembly, it is the torque applied to the housing which imparts rotation to the output assembly via the wedge-like elements rather than the torque applied to the wedge-like elements.

It may be possible to use only one resilient member to bias the pair of wedge-like elements toward each other within the housing. In addition, one or both of the resilient members can be shaped in an H configuration matching the shape of the wedge-like elements.

We claim:

1. A universal joint comprising a housing having a pair of openings leading to a cavity for receiving an input assembly with an input shaft and an output assembly with an output shaft, the input assembly being rotatable to rotate the housing which in turn rotates the output assembly, the input assembly and the output assembly defining variable angular settings relative to the housing as the input assembly, output assembly and housing rotate, the input and output assemblies each including a pair of arcuate bearing shoes rotatable about separate parallel axes, and means cooperating with the bearing shoes, the input and output shafts and the housing to reduce play therebetween, characterized by said means comprising at least one wedge-like element disposed in engagement with said housing and one bearing shoe of each said pair of bearing shoes, each said wedge-like element defining a pair of frusto-conical surfaces engageable with matching frusto-conical surfaces for said input assembly and said output assembly, respectively, a resilient member disposed between said housing and said one wedge-like element to retain said frusto-conical surfaces in engagement with said matching frusto-conical surfaces regardless of any wear of the components of the universal joint.

2. The universal joint of claim 1 in which said means comprises a pair of wedge-like elements.

3. The universal joint of claim 1 in which each said wedge-like element is substantially H-shaped with a pair of openings rotatably receiving one of the pair of bearing shoes for the input assembly and one of the pair of bearing shoes for the output assembly, respectively.

* * * * *